United States Patent [19]

Iwamura

[11] Patent Number: 5,844,623
[45] Date of Patent: Dec. 1, 1998

[54] TELEVISION WITH INTEGRATED RECEIVER DECODER

[75] Inventor: Ryuichi Iwamura, San Diego, Calif.

[73] Assignees: Sony Corporation, Japan; Sony Electronics, Inc., Park Ridge, N.J.

[21] Appl. No.: 722,631

[22] Filed: Sep. 27, 1996

[51] Int. Cl.⁶ .................................................. H04N 5/46
[52] U.S. Cl. .......................... 348/553; 348/555; 348/556; 348/563
[58] Field of Search .................................... 348/553, 555, 348/556, 557, 725, 728, 558, 563; H04N 5/44, 5/46, 5/445

[56] References Cited

U.S. PATENT DOCUMENTS

| | | | |
|---|---|---|---|
| 5,065,243 | 11/1991 | Katagiri | 348/556 |
| 5,132,793 | 7/1992 | Hirahata | 348/556 |
| 5,208,660 | 5/1993 | Yoshida . | |
| 5,534,942 | 7/1996 | Beyers, Jr. | 348/569 |
| 5,555,197 | 9/1996 | Ninomiya | 348/555 |

FOREIGN PATENT DOCUMENTS

| | | |
|---|---|---|
| 317 360 A3 | 5/1989 | European Pat. Off. . |
| 574 901 A2 | 12/1993 | European Pat. Off. . |
| 701 367 A2 | 3/1996 | European Pat. Off. . |
| 766 462 A2 | 4/1997 | European Pat. Off. . |
| WO 95/35626 | 12/1995 | WIPO . |

OTHER PUBLICATIONS

D. Gillies et al. "Comined TV Format Control And Sampling Rate Conversion IC", *IEEE Transactions on Consumer Electronics*, vol. 40, No.: 3, pp. 711–716 (Aug. 1994).
Yamamoto Hiroaki, "Patent Abstracts of Japan", *Sharp Corp.*, Appl. Date Nov. 29, 1990, p. 1.
Suzuki Norihiro, "Patent Abstracts of Japan", *Hitachi LTD*, Appl. Date Apr. 10, 1992, p. 1.
Tashiro Shigeru, "Patent Abstracts of Japan", *Toshiba Corp.*, Appl. Date Sep. 29, 1994, p. 1.
The International Search Report, PCT/US 97/17046, 14 Apr. 1998.

*Primary Examiner*—Sherrie Hsia
*Attorney, Agent, or Firm*—Blakely, Sokoloff, Taylor & Zafman LLP

[57] ABSTRACT

A television set includes an integrated receiver decoder. By integrating the receiver/decoder with the television, some circuitry and memory are shared. Moreover, a digital video signal provided by the receiver/decoder need not be converted to an analog NTSC signal before transmission to the television CRT. In one embodiment, where a television having a 16×9 aspect ratio is used, on-screen display data is displayed without distortion.

10 Claims, 8 Drawing Sheets

TELEVISION WITH INTEGRATED RECEIVER DECODER

FIELD OF THE INVENTION

The present invention relates generally to television receivers and, more particularly, to those television receivers having shared circuitry with digital receiver/decoders.

BACKGROUND

Despite the proliferation of digital computer systems in the home environment, most audio/video components, especially television receivers, remain analog oriented. As a result, devices such as video cassette recorders (VCR), digital video disk (DVD) players and digital satellite system (DSS) integrated receiver decoders (IRDs) must provide an analog output signal to a television receiver. In general, this analog output signal will be formatted to the NTSC standard for the United States.

For example, a typical DSS IRD is shown in FIG. 1. Digital signals from an orbiting satellite are received at antenna 110 attached to the IRD front-end 1. The digital signals are typical encrypted MPEG streams containing television programming as well as audio-only programming. The IRD front-end 1 is a tuner which allows a user to select a desired channel. The front-end 1 also provides amplification of the relatively weak signal received at antenna 110. For the case where a user wishes to view television programming provided by the digital satellite system service provider, switch 33 will couple the selected channel signal from front-end 1 to the transport parser (TPP) 2. In some cases, the DSS IRD will be connected to other elements of a home entertainment system though an interface (I/F) which may comply with the IEEE standards document 1394 entitled Standard for High Performance Serial Bus (hereafter, the "IEEE 1394 Serial Bus Standard"). The 1394 I/F 3 may connect the DSS IRD to a variety of video cassette recorders, digital video disk players, and other audio/visual or computer components. When the user wishes to use the DSS IRD as a home entertainment system command unit, digital signals from these other components can be supplied though 1394 I/F 3 across a corresponding serial bus. In those cases, switch 33 will be oriented so as to connect TPP 2 to 1394 I/F 3.

Transport parser 2 also includes a data encryption standard (DES) block. TPP/DES 2 parses and decrypts the digital bit stream received from front-end 1 (typically, signals received from 1394 I/F 3 will already be decrypted and will bypass the decryption engine in TPP/DES 2). The decrypted bit stream is then passed though traffic controller (TC) 4 and is stored in RAM 5. RAM 5 may be a 16 megabyte synchronous dynamic RAM for one embodiment. For those cases where a user wishes to record signals received from the digital satellite system service, the decrypted bit stream from TPP/DES 2 is also transmitted to other audio/visual components, for example a digital video cassette recorder, though 1394 I/F 3.

Traffic controller 4 distributes the stored data from RAM 5 to an appropriate decoder. This may be either video decoder 7 or audio decoder 8. For the case of video data, the signal is passed from RAM 5 though traffic controller 4 to video decoder (VDEC) 7 where it is decoded according to the MPEG standards. Likewise, audio data is transferred from RAM 5 though traffic controller 4 to audio decoder (ADEC) 8 for decoding. Up to this point, both the audio and video signals are in digital format. However, these signals must be converted to an analog format for presentation through a conventional television set. Accordingly, audio signals are converted in digital-to-analog (D/A) converter 13 before being passed to a speaker. Video signals are converted from a digital to an analog signal and the analog signal is encoded according to the NTSC standard in NTSC encoder 12. This NTSC signal may be transmitted to an analog video cassette recorder.

In addition, video signals must be passed from video decoder 7 to the analog television set. Accordingly, a second NTSC encoder 100 is provided for this purpose. The video signals may be mixed in mixer 9 with on screen display data, such as a programming table, before being encoded. The on screen display data present in the MPEG stream is decoded by on screen display block 6 prior to mixing.

All of the above operations are controlled via control signals provided by central processing unit 15.

Because the digital video signal must be converted to an analog NTSC signal for transmission to the television set, picture quality is degraded. Accordingly, it would be desirable to have a means for decrypting and decoding digital television broadcast signals without having to convert such digital signals to analog NTSC signals before presentation.

SUMMARY OF THE INVENTION

The present invention provides a television set with an integrated digital receiver/decoder. By integrating the receiver/decoder with the television, some circuitry and memory can be shared. Moreover, the digital video signal provided by the receiver/decoder need not be converted to an analog NTSC signal before transmission to the television. Accordingly, picture quality is less degraded than in systems utilizing standard NTSC connections. In one embodiment, where a television having a 16×9 aspect ratio is used, on screen display data is displayed without distortion.

In one embodiment, a television has first circuitry for decoding and displaying television signals having a first format, e.g., NTSC signals. The television also has second circuitry for decoding and displaying television signals having a second format, e.g., MPEG signals. The first and second circuitry are coupled together and may include a shared memory. The first circuitry may include circuitry for separating luminance and chrominance information and circuitry for using such information to generate RGB signals for display. The second circuitry may include MPEG decoders for video and audio data.

BRIEF DESCRIPTION OF THE DRAWINGS

The present invention is illustrated by way of example and not limitation in the figures of the accompanying drawings in which like numerals indicate similar elements and in which.

DETAILED DESCRIPTION

Figure 2:
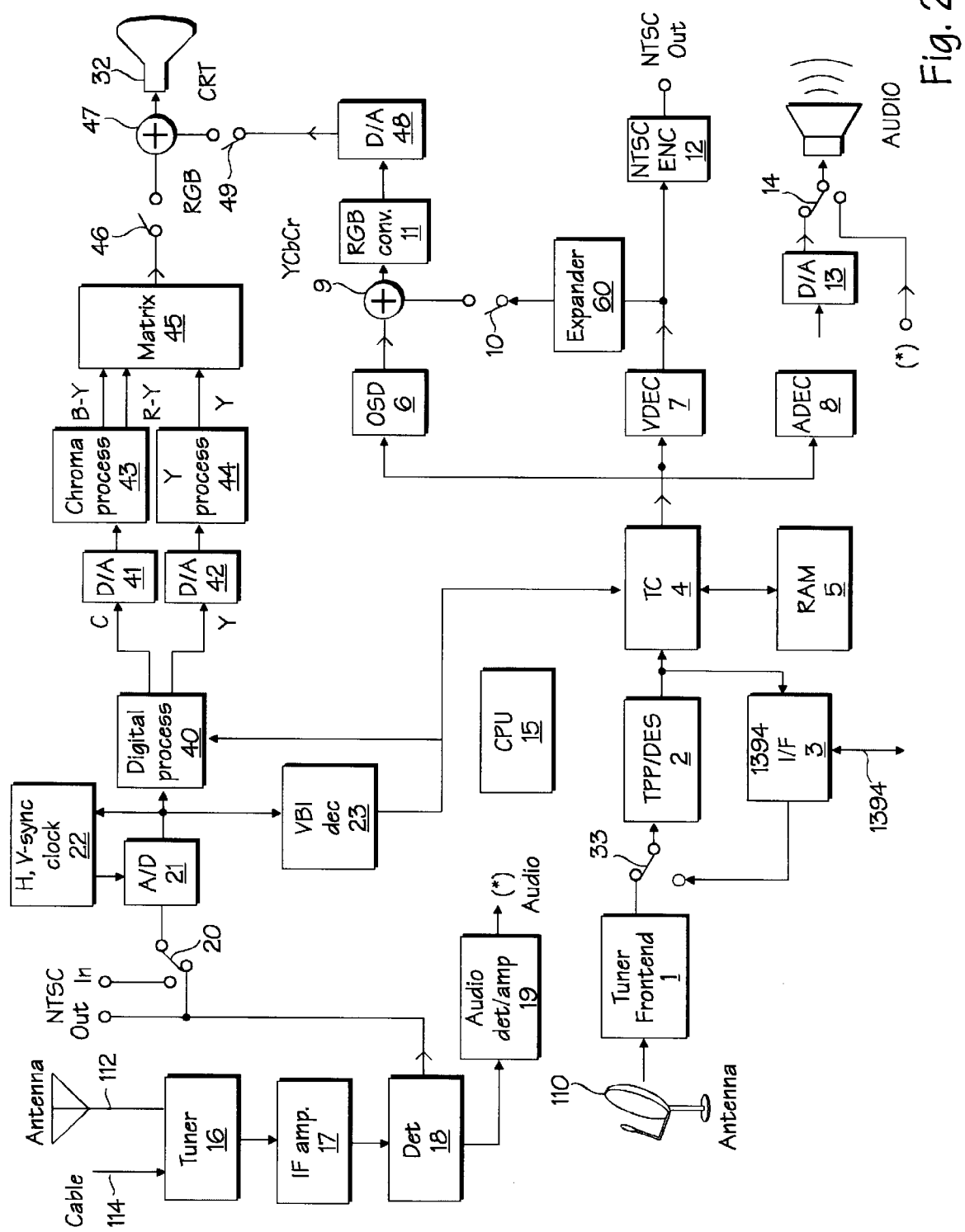
FIG. 2 illustrates one embodiment of a television having an integrated receiver decoder according to the present invention.

A television with an integrated receiver decoder is disclosed. Although the present invention is described with reference to a digital satellite system integrated receiver decoder (DSS IRD), those skilled in the art will appreciate that the present invention is also applicable to the integration of any digital audio/video component capable of decoding MPEG streams with a television receiver. FIG. 2 illustrates one embodiment of a digital television set with an integrated receiver/decoder.

Figure 1:
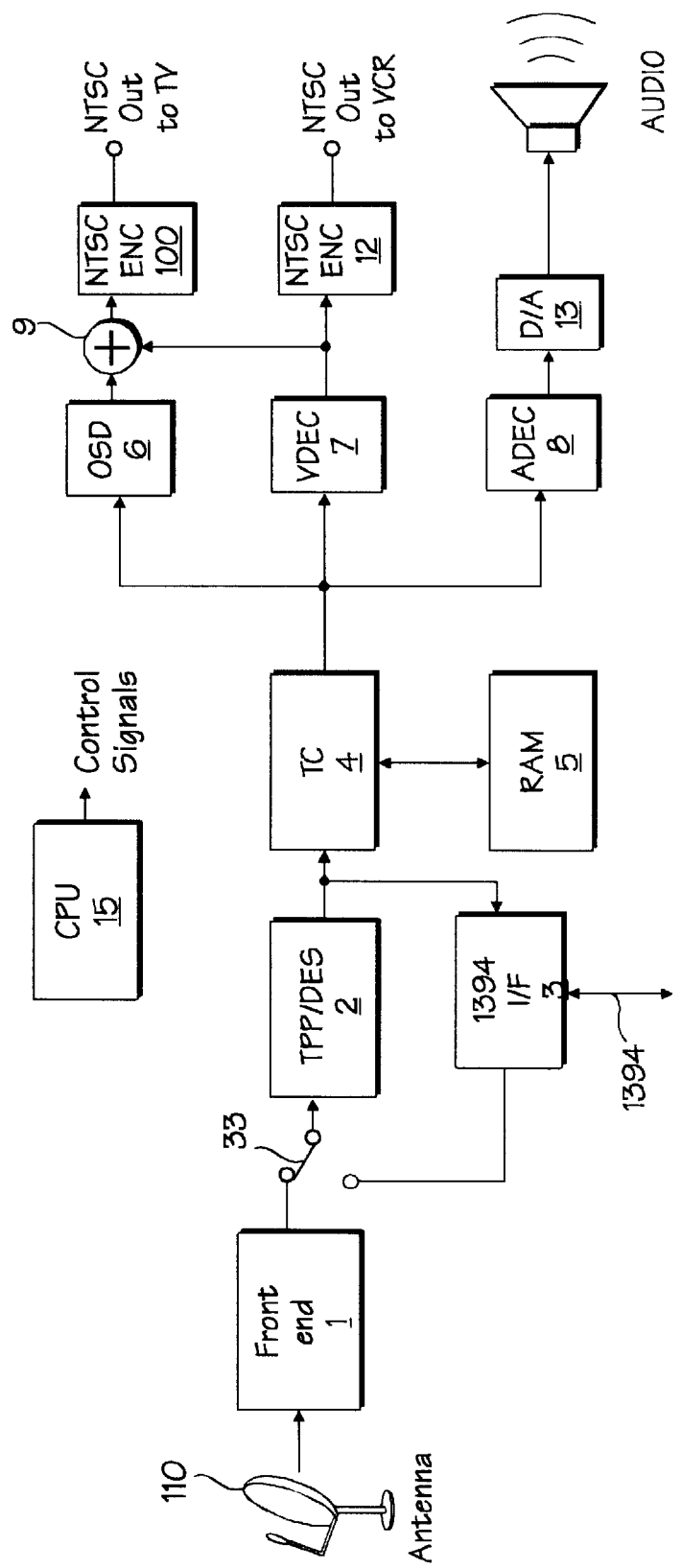
FIG. 1 illustrates an exemplary digital satellite system integrated receiver decoder which provides an analog output.

As was the case for the conventional DSS IRD shown in FIG. 1, in the integrated system of FIG. 2 antenna 110 receives digital signals provided by a digital satellite system service provider and outputs those signals to a tuner/front-end 1. Tuner/front-end 1 allows a user to select a desired channel and also amplifies the relatively weak signal provided by antenna 110. For the case where a user wishes to view DSS programming, switch 33 is oriented so as to connect tuner/front-end 1 to TPP/DES block 2.

The DSS IRD portion of the integrated system also provides an Interface 3 to connect to other digital audio/visual components. Interface 3 preferably operates according to the IEEE 1394 Serial Bus Standard, as described above. In other embodiments, however, other digital networks may be used and Interface 3 will operate accordingly. For the case where the user wishes to view pre-recorded programming, switch 33 is oriented so as to connect Interface 3 to the TPP/DES block 2.

The digital signal is parsed and decrypted (if necessary) by TPP/DES block 2 and passed to traffic controller 4. Traffic controller 4 stores the decrypted bit stream in RAM 5, which may be a 16 megabyte synchronous dynamic RAM. For the case where a user wishes to record the programming, the decrypted bit stream is also transmitted to other audio/visual components across the 1394 serial bus though Interface 3.

Traffic controller 4 distributes the stored data in RAM 5 to video decoder 7 and audio decoder 8 as appropriate. Video decoder (VDEC) 7 receives video data from RAM 5 and decodes it according to the MPEG standard. Similarly, audio decoder 8 receives audio data from RAM 5 and decodes it according to the MPEG standard. The decoded audio signal is passed from audio decoder 8 to digital-to-analog converter 13 where it is converted to an analog signal. This analog audio signal is then passed to a speaker system. Switch 14 connects the digital-to-analog converter 13 to the speaker system when the integrated system is in a receiver/decoder mode. In a television mode, switch 14 will connect the speaker system to an audio detector/amplifier 19.

On screen display data stored in RAM 5 as part of the MPEG stream is transmitted though traffic controller 4 to the on screen display (OSD) block 6. OSD block 6 decodes the on screen display data, for example, a program guide, constructs the on screen display information and assigns appropriate colors to each pixel using a color look-up table. The on-screen display data is then mixed in mixer 9 with decoded video data from video decoder 7 for display.

In 4×3 display mode (i.e., where CRT 32 has a standard 4×3 aspect ratio), the decoded video signal from video decoder 7 is passed though expander 60 but is not expanded. However, when the output of video decoder 7 is a 16×9 signal and CRT 32 has a 16×9 aspect ratio and 16×9 display mode has been selected, expander 60 horizontally expands the video data provided by video decoder 7 to 16×9 format. In this case, the horizontal pixel number will be enlarged four-thirds times. Further details of the 16×9 mode are described below.

In receiver/decoder mode, switch 10 is closed. Accordingly, mixer 9 mixes the decoded video output from VDEC 7 and the on screen display data from OSD block 6 and passes the mixed signal to RGB converter 11. RGB converter 11 converts the digital bit stream to appropriate RGB signals for CRT 32. The RGB signals are transmitted to digital-to-analog converter 48 which converts the digital RGB signals to their analog equivalents. Switch 49 is closed and the analog RGB signals are passed to CRT 32 though mixer 47. Note that in receiver/decoder mode, switch 46 will be open so no mixing occurs in mixer 47. The resulting signal is applied to CRT 32 and video data is thereby displayed.

All of the above described blocks are under the control of CPU 15 which provides the appropriate control signals for the above operation. CPU 15 may also handle user interface functions though a user interface block (not shown). This user interface block may be front panel controls or an infra-red or other remote control. While in receiver/decoder mode, the television circuits (described below) are placed in a low power or halt mode.

While in receiver/decoder mode, the output of video decoder 7 may also be sent to NTSC encoder 12 where it is converted to an analog NTSC signal. This analog NTSC signal may be passed to an analog video cassette recorder to allow for recording of television programming. It should be noted that this embodiment of the present invention requires only one NTSC encoder whereas existing receiver/decoders require two NTSC encoders, as shown in FIG. 1. By providing video signals directly to CRT 32, the need for a second NTSC encoder is eliminated.

The integrated system shown in FIG. 2 also has a number of traditional television circuits. In television mode, i.e., when these television circuits are in use, the receiver/decoder circuits described above will be placed in a low power or halt mode by CPU 15. In this way, power is conserved.

In television mode, a signal from an antenna 112 or cable television source 114 is first tuned to a desired channel at tuner 16 then amplified in amplifier 17 and detected in detector 18. All of these operations are conventional and well known in the art Detector 18 outputs a video signal and an audio signal. The audio signal is detected by audio detector/amplifier 19 and passed to a speaker system though switch 14.

The video signal from detector 18 is sampled by analog-to-digital (A/D) converter 21. The digital signal output from A/D converter 21 is passed to block 22 where the horizontal and vertical sync pulses are extracted and fed back to the sampling clock of A/D converter 21.

It should be noted that the television circuits also provide for the detected video signal to be transmitted to an analog video cassette recorder via an NTSC output. Because the signals are already in standard NTSC format, no encoder is required. In addition, analog signals from a video cassette recorder can be passed to A/D converter 21 though an NTSC input. In such a case, switch 20 would be oriented appropriately.

The digital signals from A/D converter 21 are passed to vertical blanking interval (VBI) decoder 23 which decodes any data contained in the VBI (e.g., closed captioning data) of the NTSC signal and stores this data in RAM 5 under the control of TC 4. The data stored in RAM 5 is sent to OSD block 6 though TC 4 and decoded appropriately. The luminance and chrominance outputs of OSD block 6 are converted to RGB format in RGB converter 11 and then converted to an analog signal by D/A converter 48. The analog RGB signal is passed to mixer 47 though switch 49 to allow the decoded VBI information to be displayed on CRT 32. In addition to VBI information, various other data can be displayed using the on screen display function while in the television mode. It should be noted that in the television mode, switch 10 is open.

Figure 4:
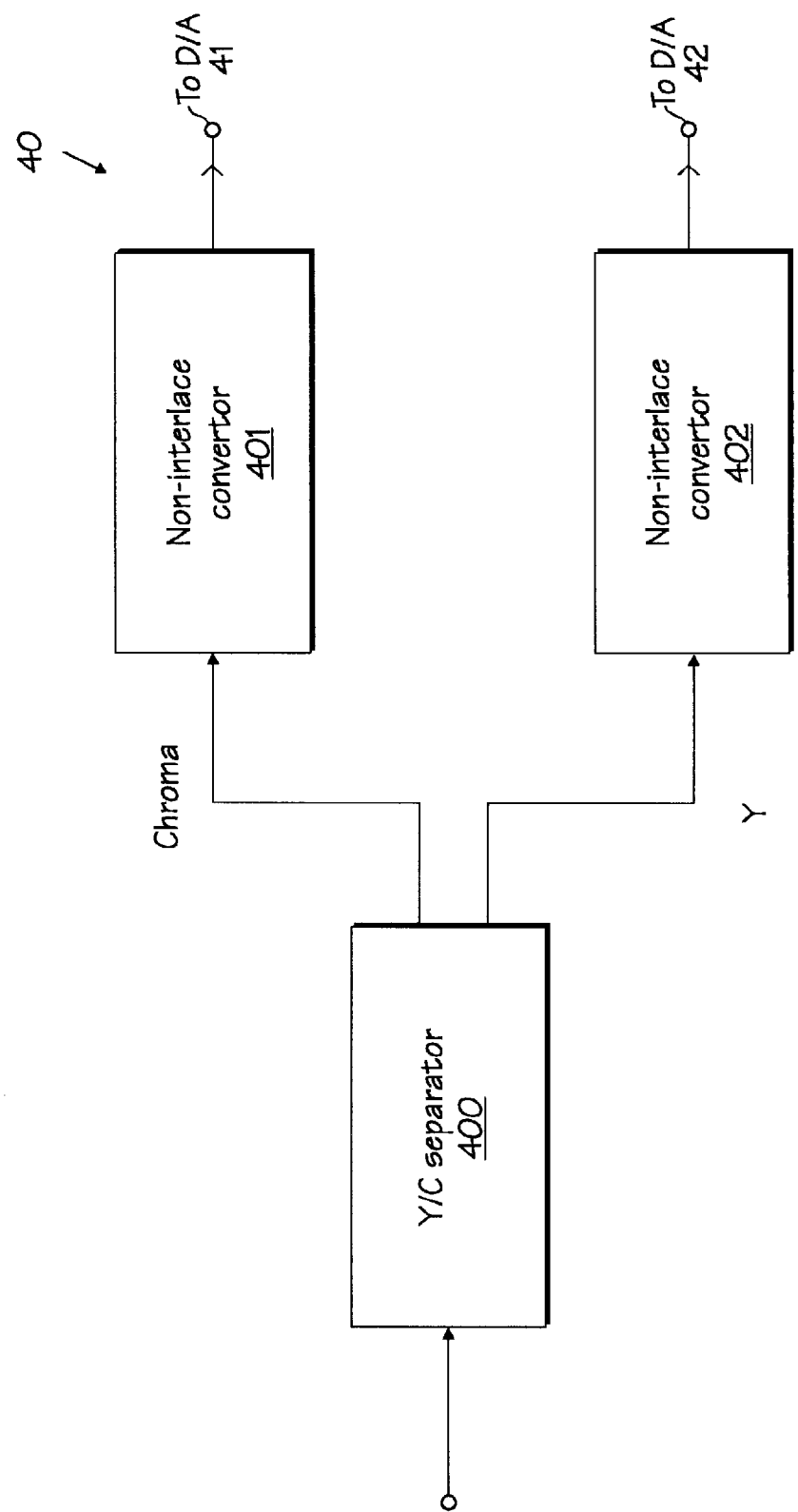
FIGS. 4 illustrates a digital process in which luminance information is separated from chrominance information.

The digital NTSC signal from A/D converter 21 is also provided to digital process 40. Digital process 40 includes a luminance/chrominance separator and two non-interlace converters. FIG. 4 illustrates digital process 40 in detail.

As shown in FIG. 4, digital process 40 consists of a luminance/chrominance separator 400 which separates the luminance (Y) and chrominance (C) information present in the NTSC signal. Chrominace information is passed to non-interlace converter 401 while luminance information is passed to non-interlace converter 402.

Figure 5:
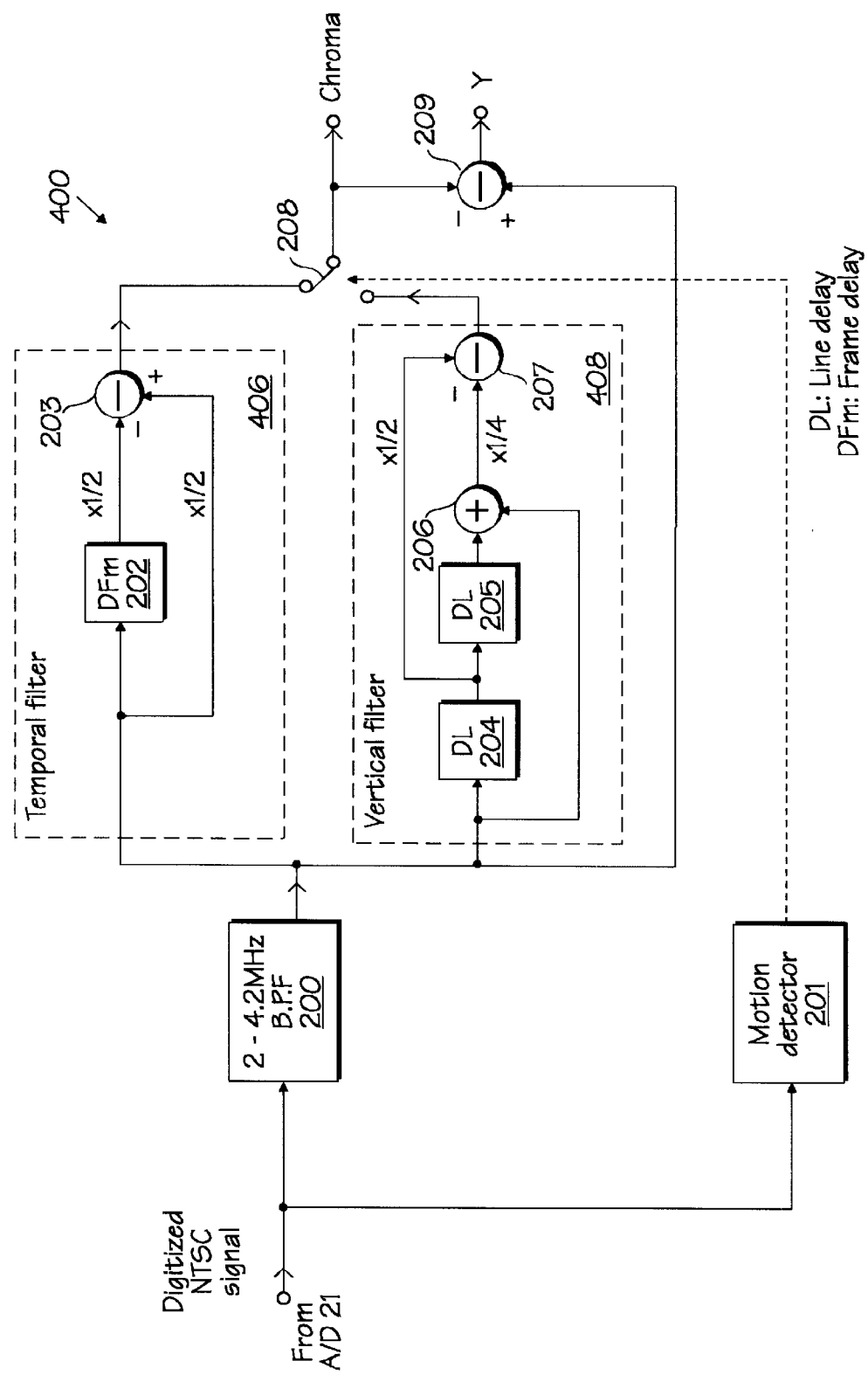
FIG. 5 illustrates luminance/chrominance separators for the television shown in FIG. 2;.

FIG. 5 illustrates luminace/chrominance separator 400 in detail. The digital NTSC signal from A/D converter 21 is filtered in band-pass filter 200 and transmitted to temporal filter 406 and vertical filter 408. Temporal filter 406 consists of frame delay 202 and subtractor 203. Because the color sub-carrier in the digital NTSC signal is inverted in each adjacent frame when the picture does not have any motion, temporal filter 406 can extract the chrominance signal. Vertical filter 408 is a three tap high pass filter. It consists of line delays 204 and 205, mixer 206, and subtractor 207. Thus, luminance/chrominance separator 400 is a typical two-dimensional luminance/chrominance separator as is common in the art.

Motion detector 201 of luminance/chrominance separator 400 detects motions in pictures. When the pictures have fewer motions, motion detector 201 connects switch 208 to temporal filter 406. Otherwise, motion detector 201 connects switch 208 to vertical filter 408. The output of switch 208 is the chrominance signal while the output of subtractor 209 is the luminance signal.

Figure 6:
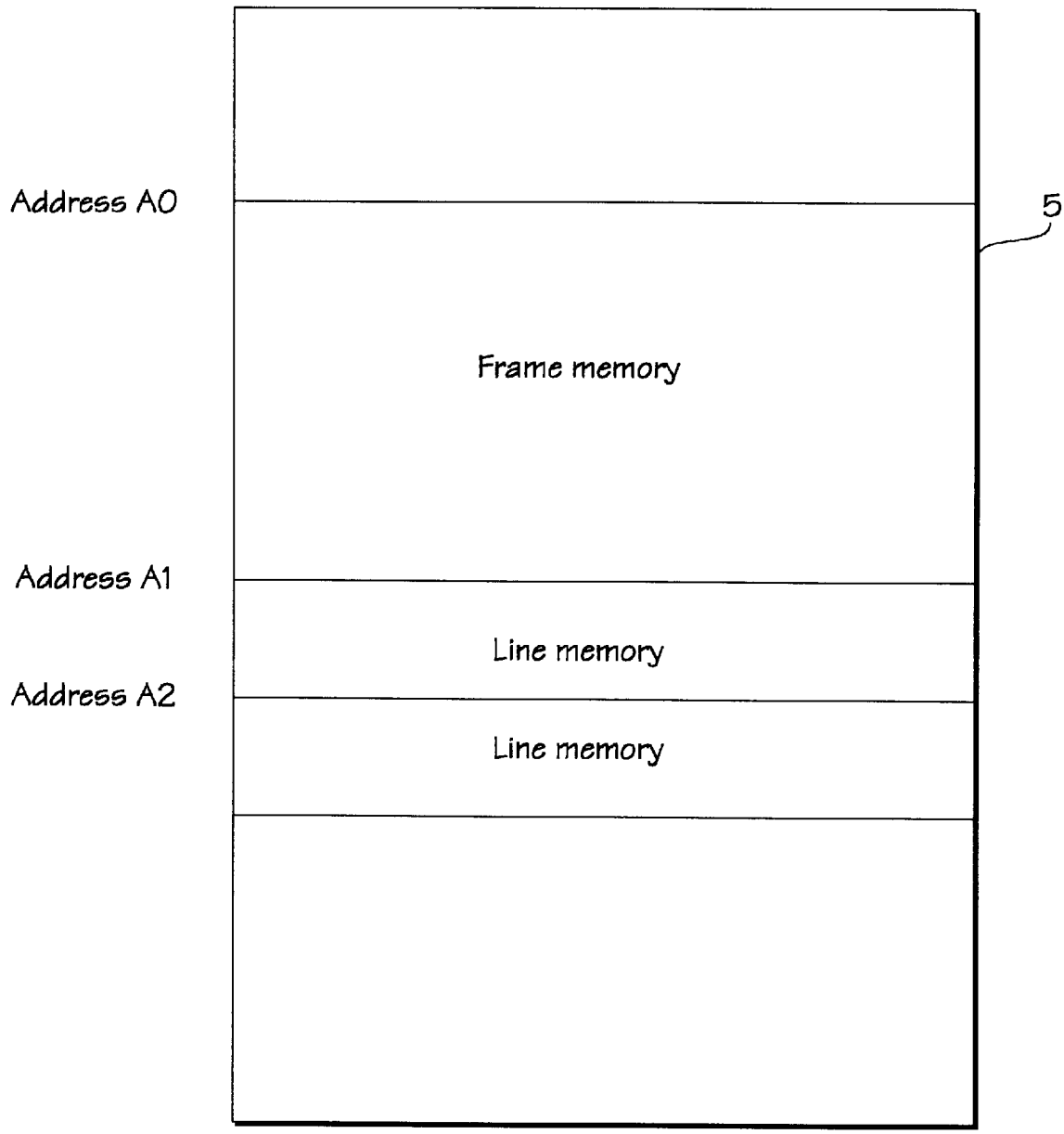
FIG. 6 is a memory map for a random access memory of a television having an integrated receiver decoder.

Although frame delay 202, line delay 204 and line delay 205 are illustrated as independent blocks in FIG. 5, those skilled in the art will appreciate that these need not be separate components. In one embodiment, the output signals from band-pass filter 200 are stored in RAM 5 under the control of traffic controller 4. To allow for the storage, some areas of RAM 5 are assigned to frame memory and others are assigned to line memory. This is illustrated in FIG. 6. In this example, the area of RAM 5 between addresses A0 and A1 allows for the storage of frame delay 202. Storage for line delays 204 and 205 are assigned from addresses A1 and A2, respectfully. By utilizing RAM 5 in this manner, digital process 40 does not require a separate memory.

Figure 7:
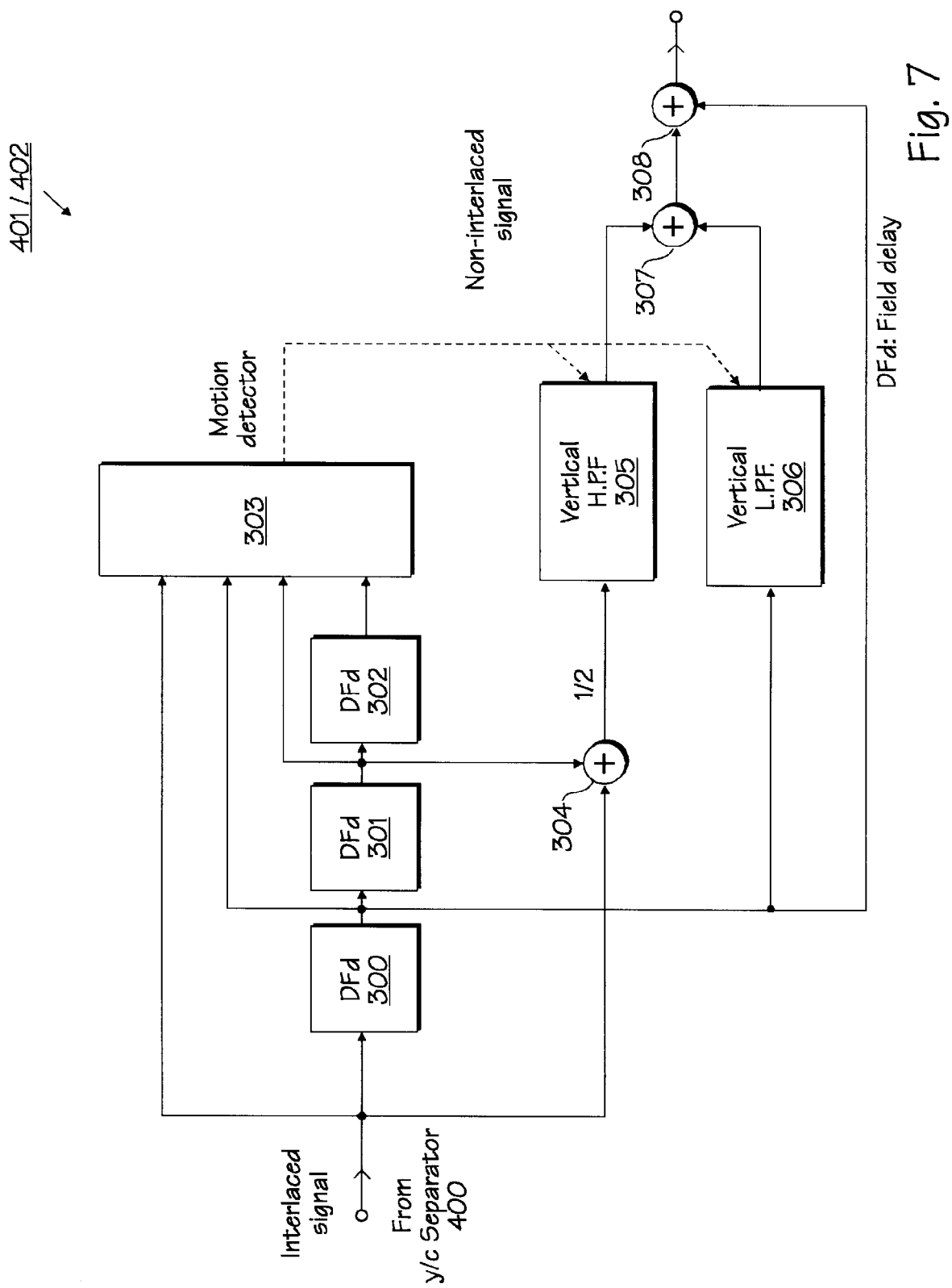
FIG. 7 illustrates a non-interlace converter for use with a television having an integrated receiver/decoder.

FIG. 7 illustrates non-interlace converters 401 and 402 of digital process 40. Each of the non-interlace converters is identical. Blocks 300, 301 and 302 are field delays. In order to interpolate between lines, the current line and the line two fields prior are added in adder 304 and divided by 2. The output is passed to vertical high pass filter 305. The output of delay 300 is passed to vertical low pass filter 306. Motion detector 303 detects motions in the pictures and adjusts the ratio of mixing between the outputs of vertical high pass filter 305 and vertical low pass filter 306 in adder 307. When the pictures have fewer motions, the ratio of outputs from filter 305 to those from filter 306 increases. In other cases, the ratio of outputs from filter 306 to those from filter 305 increases. By adding the result to the original signal in adder 308, a non-interlaced signal output is obtained. It will be appreciated that, as was the case for line delays and frame delays 202, 204 and 205, field delays 300, 301 and 302 need not be independent components but may be areas assigned in RAM 5.

Returning to FIG. 2, the chrominance signal from digital process 40 is converted to an analog signal by D/A converter 41. The analog signal output from D/A converter 41 undergoes chroma process 43 which is a conventional analog color signal decoder. Chroma process 43 outputs B-Y and R-Y signals to Matrix 45.

Luminance signal Y from digital process 40 is converted to an analog signal by D/A 42. The output analog signal then undergoes luminance process 44, which is a conventional analog luminance signal controller/amplifier. The output of luminance process 44 is also provided to Matrix 45.

Matrix 45 converts the luminance and chrominance inputs described above to RGB signals and provides the RGB signals to mixer 47 though switch 46. Mixer 47 mixes the RGB signals from Matrix 45 with any on screen display signals from D/A converter 48 and provides the mixed signal output to CRT 32. All of the above described blocks and processes are under the control of CPU 15 which provides the appropriate control signals.

Figure 3:
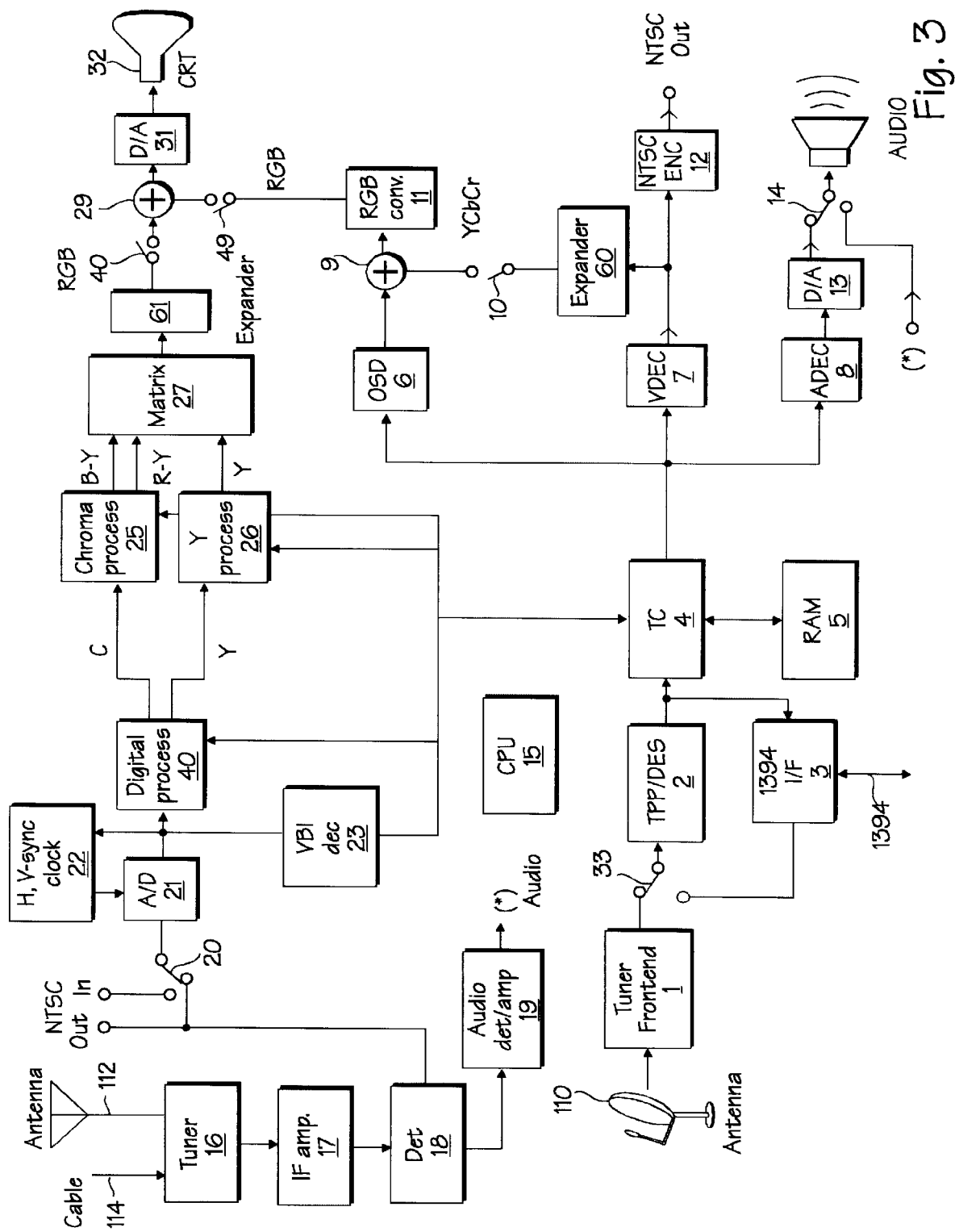
FIG. 3 illustrates a second embodiment of a television with an integrated receiver decoder according to the present invention.

FIG. 3 illustrates a second embodiment of the integrated system. For the example shown in FIG. 3, the NTSC decoding process for the television circuitry is completely digitized. The same numerals are used in FIG. 3 as in FIG. 2 for similar components.

There are two distinctions between the example shown in FIG. 2 and the example shown in FIG. 3. First, for the example shown in FIG. 3, chroma process 25, luminance process 26 and Matrix 27 are all fully digitized. The digital processing mirrors that described above for the analog case, however, appropriate digital filters are used. These filters and digital processing techniques are known in the television art. These blocks may employ RAM 5 as a common memory for the required digital signal processing operations. Second, the mixing operation provided by mixer 29 is a digital mixing process. That is, the digital RGB signal from Matrix 27 is mixed with a digital on screen display signal from OSD block 6 before the mixed signal is finally converted to an analog output in D/A converter 31 for transmission to CRT 32. The output of Matrix 27 may be digitally expanded in expander 61 if CRT 32 has a 16×9 aspect ratio. Otherwise, the signal is not expanded.

Figure 8:
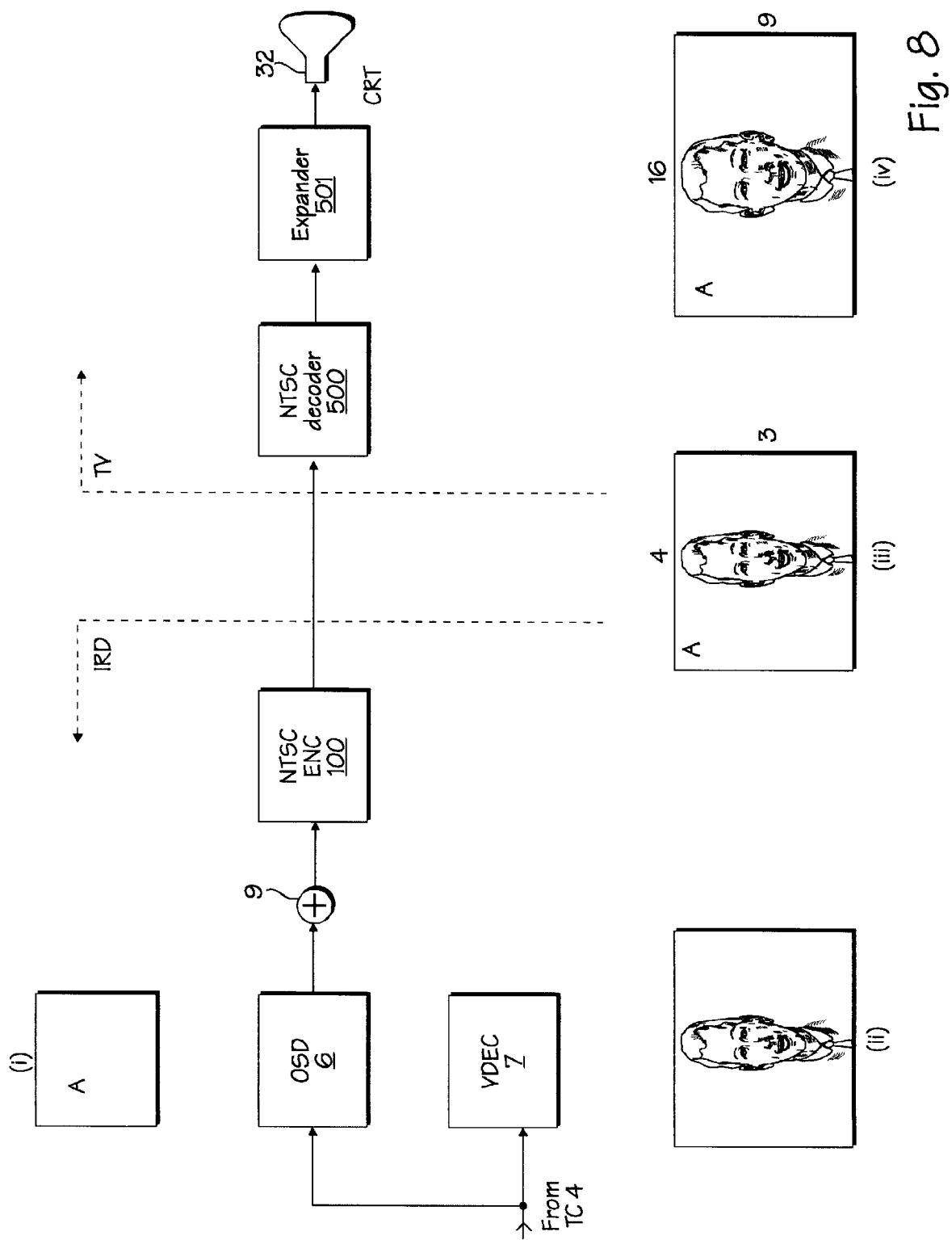
FIG. 8 illustrates a mixed television signal containing video data and on screen display data.

FIG. 8 show the case where the receiver/decoder decodes 16×9 squeezed video which is then displayed in 16×9 format. The use of 16×9 video signals is becoming more and more common in the industry. However, because OSD data is typically not formatted for display on 16×9 televisions, certain undesirable characteristics result. To illustrate, notice that for existing receiver/decoders, video decoder 7 decodes the 16×9 squeezed picture. At this point, the video signals are "squeezed" as shown by illustration (ii). The on screen display data, in this case the letter A, generated in OSD block 6 is not squeezed, as shown in illustration (i). These two signals are mixed in mixer 9 and NTSC encoded in NTSC encoder 100. The output of NTSC encoder 100 is shown in illustration (iii). It includes a squeezed video picture and non-squeezed OSD information. A television NTSC decoder 500 decodes this signal and expander 501 expands the signal to 16×9 size. The result is shown in illustration (iv). Not only is the squeezed video picture expanded (to yield a property formatted image), but the OSD data is also expanded horizontally. This results in the OSD data being distorted on the screen. This is an undesirable characteristic.

One solution to avoid this problem is to make the original OSD data "leaner" (i.e., squeeze the OSD signal) before it is mixed with the video signal in mixer 9. However, this solution would require the receiver/decoder to generate two types of OSD data. This would be necessary because where the CRT 32 is operated in 4×3 mode, non-squeezed OSD data would be required. Alternatively, the receiver/decoder may have a software or hardware converter which compresses the OSD data horizontally. Either way, additional memory will be required.

The present invention eliminates the problems described above. In the present invention, the receiver/decoder output is not NTSC encoded. As described above, the OSD data is mixed with already expanded video data. Therefore, OSD data need never be expanded prior to display, even if the CRT operates in a 16×9 mode. This eliminates the problem presented by existing receiver decoders and it is a further advantage of the present invention.

In addition to the functions described above, a fully digitized television may have other functions such as noise reduction, picture-in-picture, etc. Where such functions are implemented, RAM 5 can be used as a shared memory.

Thus, a television having an integrated receiver/decoder has been described. Although features and examples of the present invention have been described with references to specific exemplary embodiments thereof, those skilled in the art will appreciate that certain modifications may be possible without departing from the broader spirit and scope of the invention which should be limited only by the claims which follow.

What is claimed is:

1. A television, comprising:
   first circuitry configured to decode and display television signals having a first signal format; and
   second circuitry coupled to said first circuitry configured to decode and display television signals having a second signal format and further configured to encode said television signals in said first signal format.

2. A television as in claim 1 wherein said first signal format is an NTSC format and said second signal format is an MPEG format.

3. A television as in claim 2 wherein said first circuitry comprises:
   a first processor for separating luminance and chrominance information present in said NTSC format; and
   a second processor coupled to said first processor for generating RGB signals from said luminance and chrominance information.

4. A television as in claim 3 wherein said first processor includes a memory shared by said second circuitry.

5. A television as in claim 4 wherein said second circuitry comprises:
   a video decoder coupled to said memory, said video decoder for decoding MPEG video signals present within said television signals having said MPEG format; and
   an audio decoder coupled to said memory, said audio decoder for decoding MPEG audio signals present within said television signals having said MPEG format.

6. A television as in claim 5 wherein said television signals having said MPEG format are encrypted prior to being transmitted and said second circuitry further comprises decryption means coupled to said memory for decrypting said encrypted television signals.

7. A television as in claim 5 wherein said second circuitry comprises a digital satellite system integrated receiver decoder.

8. A method of mixing on-screen display data with video data for presentation on a television, the method comprising the steps of:
   decoding said video data from a received television signal to produce decoded video data;
   decoding said on-screen display data from said received television signal to produce decoded on-screen display data;
   expanding said decoded video data to produce expanded aspect ratio format video data; and
   mixing said expanded aspect ratio format video data with said decoded on-screen display data to produce a mixed signal.

9. The method of claim 8 further comprising the step of encoding said mixed signal in a format for presentation on the television.

10. The method of claim 9 wherein said format is an NTSC format.

* * * * *

UNITED STATES PATENT AND TRADEMARK OFFICE
CERTIFICATE OF CORRECTION

PATENT NO. : 5,844,623
DATED : December 1, 1998
INVENTOR(S) : Ryuichi Iwamura

It is certified that error appears in the above-indentified patent and that said Letters Patent is hereby corrected as shown below:

In column 4 at line 49 delete "art" and insert --art.--

Signed and Sealed this

Twenty-sixth Day of October, 1999

Attest:

Q. TODD DICKINSON

*Attesting Officer*          *Acting Commissioner of Patents and Trademarks*